Aug. 22, 1944.  G. R. ROESCH ET AL  2,356,433
GLASS GRINDING APPARATUS
Filed Aug. 12, 1941  2 Sheets-Sheet 1

Inventors
GEORGE R. ROESCH.
GERALD WHITE.
By Frank Fraser
Attorney

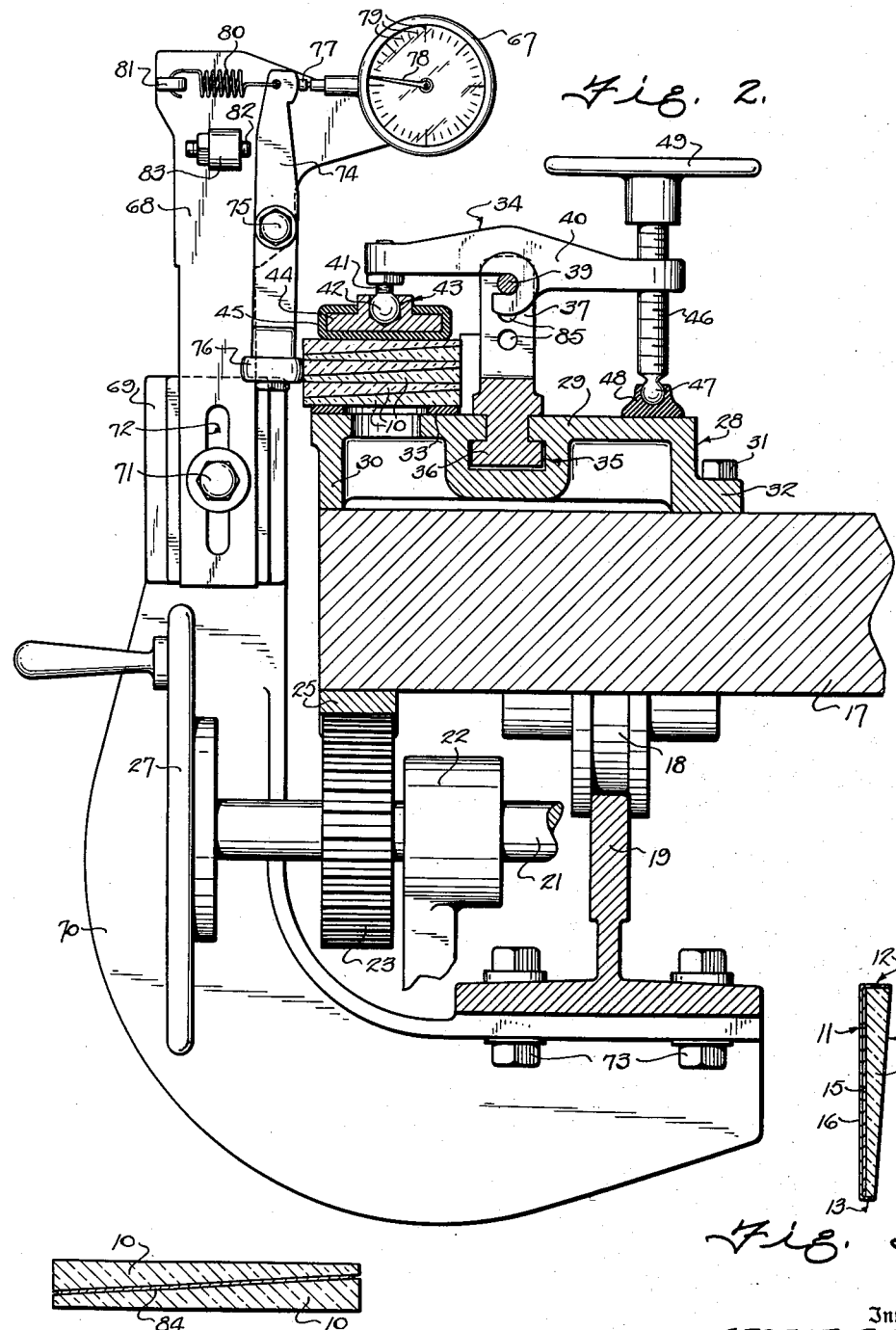

Patented Aug. 22, 1944

2,356,433

UNITED STATES PATENT OFFICE 2,356,433

GLASS GRINDING APPARATUS

George R. Roesch and Gerald White, Toledo, Ohio, assignors to Libbey-Owens-Ford Glass Company, Toledo, Ohio, a corporation of Ohio Application August 12, 1941, Serial No. 406,486

3 Claims. (Cl. 51—122)

The present invention relates broadly to grinding apparatus and more particularly to a machine for grinding the edges of flat sheets or plates of glass and the like.

Although the machine of this invention is not limited to any specific use, it has been designed primarily for and is of especial utility in the edging of so-called glass mirror plates which are used in the making of rear view mirrors for automotive vehicles and the like. More particularly, the machine is adapted for grinding the edges of prismatic mirror plates substantially triangular in cross section having the rear surface thereof plane and perpendicular with respect to the upper and lower edges of the plate and the front surface arranged at a slight angle with respect to the plane surface. The plane rear surface of the glass plate is provided with a suitable reflecting medium such as a coating of silver. It has been found that such a mirror makes a very satisfactory rear view mirror for automotive vehicles and the like in that it greatly reduces, if not entirely eliminates, objectionable glare from the headlights of automobiles approaching in the rear.

An important object of the invention is the provision of an improved machine for grinding the upper and lower edges of one or a plurality of glass mirror plates of the above character rapidly, accurately, and economically.

Another important object of the invention is the provision of an edge grinding machine of the above character embodying means for supporting and firmly securing a plurality of glass mirror plates in position to be operated upon and for preventing displacement thereof or movement relative to one another during grinding.

A further important object of the invention is the provision of an edge grinding machine of the above character embodying means for indicating the amount of glass to be ground from the edges of the mirror plates and for also indicating when said plates have been ground to the desired predetermined size.

Other objects and advantages of the invention will become more apparent during the course of the following description when taken in connection with the accompanying drawings.

In the drawings wherein like numerals are employed to designate like parts throughout the same:

Fig. 2 is a vertical transverse section therethrough taken substantially on line 2—2 of Fig. 1;

Fig. 4 is a transverse sectional view showing the manner in which a plurality of the glass plates are associated with one another for grinding; and Fig. 5 is a transverse section through a prismatic mirror formed from one of the mirror plates.

Figures 1, 3:
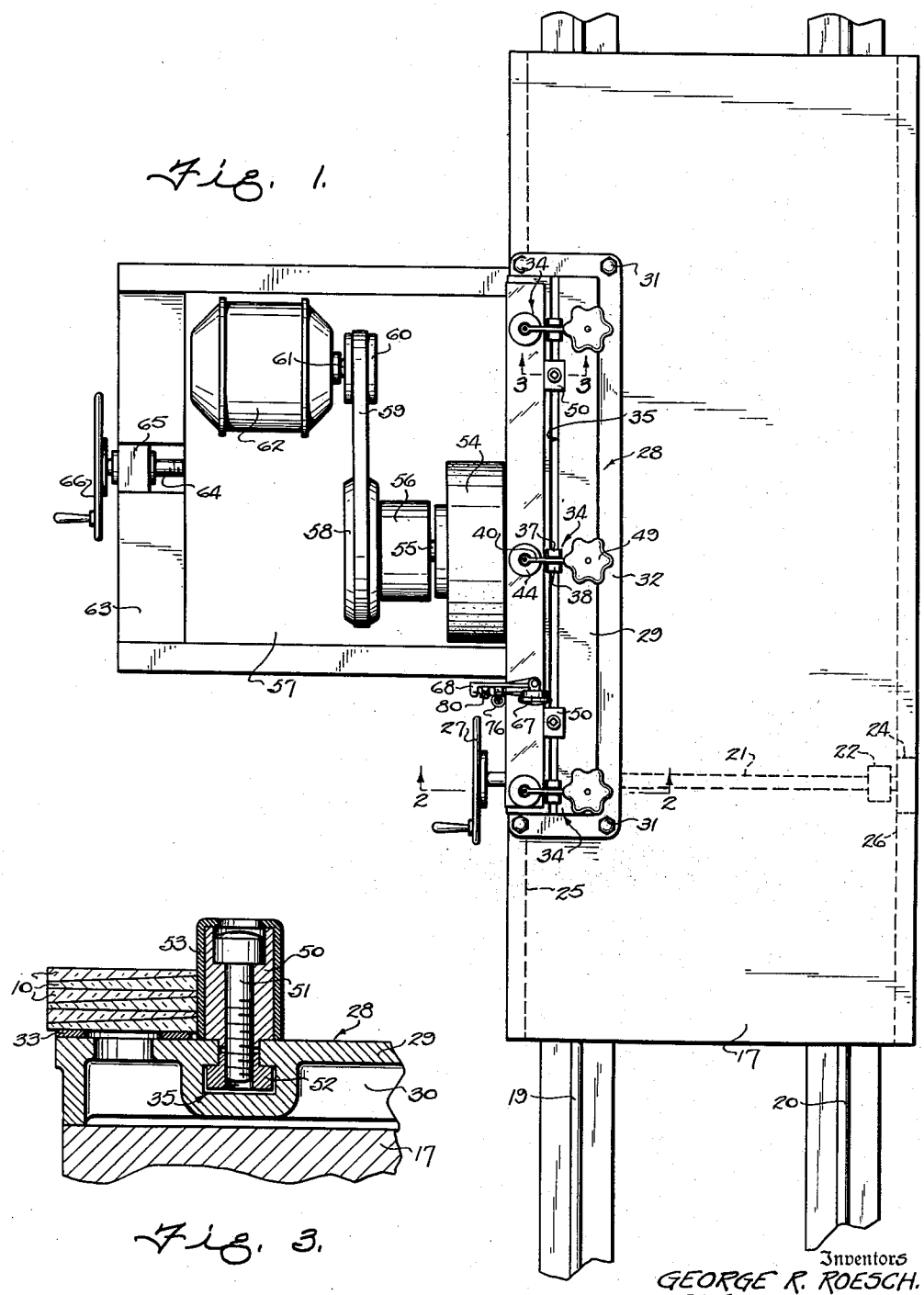
Fig. 1 is a plan view of an edge grinding machine constructed in accordance with the invention.
Fig. 3 is a detail transverse section through a portion of the glass plate supporting means taken substantially on line 3—3 of Fig. 1.

With reference now to the drawings, there is shown in Fig. 5 a prismatic rear view mirror for automotive vehicles and the like comprising a glass plate 10 in the form of a triangular prismoid having a plane back surface 11 extending perpendicular with respect to the upper and lower longitudinal edges 12 and 13 thereof and a front surface 14 which is arranged at a slight angle with respect to the back surface 11. The back surface 11 is provided with any suitable type of reflecting media, such as a silver coat 15, covered by a protective backing 16 if desired.

In Figs. 1, 2 and 3 is illustrated a preferred form of machine for grinding the upper and lower longitudinal edges 12 and 13 of the triangular mirror plate 10 to render them perpendicular with respect to the back surface 11 and also to provide a mirror of desired predetermined width. The machine comprises a reciprocating table 17 provided with wheels 18 which are supported upon and adapted to run along rails 19 and 20. The reciprocating movement of the table 17 along rails 19 and 20 is effected by a rack and pinion drive including a horizontal transverse shaft 21 mounted at its opposite ends in bearings 22 and having keyed thereto pinions 23 and 24 meshing with rack bars 25 and 26 respectively secured to the underside of the table. Carried at the forward end of shaft 21 is a hand wheel 27 by means of which the operator can turn said shaft to effect movement of the table 17 first in one direction and then the other along rails 19 and 20.

Supported upon the top of table 17 and positioned along the forward edge thereof is a substantially rectangular supporting member 28 including a horizontal top plate 29 having a depending skirt 30 around the perimeter thereof. The supporting member 28 may be secured to the table in any suitable manner such as by means of bolts or the like 31 passing through horizontal base flanges 32 formed integral with the depending skirt 30 along the back and at the opposite ends of the supporting member 28. A plurality of glass mirror plates 10 to be edged are adapted to be supported upon the top plate 29 of supporting member 28 along the forward edge thereof and, as shown in Fig. 2 by way of example, six mirror plates 10 are laid horizontally one upon the other. These mirror plates are alternately arranged so that the thinner portion of one mirror plate is disposed opposite the thicker portion of the adjacent mirror plate or plates. By arranging the mirror plates in this manner, the bottom surface of the lowermost mirror plate will be horizontal and the top surface of the uppermost mirror plate also horizontal. This will greatly facilitate the supporting of a stack of mirror plates and the securing of them firmly against displacement or movement relative to one another during the edge grinding operation. It is preferred that the stack of mirror plates 10 be supported upon a pad 33 of rubber or other suitable cushioning material laid upon the top plate 29 of supporting member 28.

The stack of mirror plates 10 is secured in place by a suitable number of clamps 34 slidably carried by the supporting member 28 so that they can be moved longitudinally thereof to the desired positions. To this end, the top plate 29 of supporting member 28 is provided intermediate the front and rear longitudinal edges thereof with an undercut channel 35, and each clamp 34 comprises a guide block 36 slidable within said channel. Formed integral with the guide block 36 are the spaced, upstanding arms 37 and 38 carrying at their upper ends a horizontal pin 39 upon which is pivotally mounted a substantially horizontal lever 40. Carried at the forward end of lever 40 is a vertical bolt 41 provided at its lower end with a ball-like head 42 received within a socket 43 formed in a circular clamping block 44, said clamping block being preferably covered with rubber, rubber composition or the like 45 which will not mar the glass. Threaded through the rear end of the lever 40 is a vertical bolt 46 to the lower end 47 of which is secured a pad 48 also of rubber, rubber composition or the like. Fixed to the upper end of bolt 46 is a hand wheel 49.

When it is desired to secure the stack of mirror plates 10 upon the supporting member 28, the clamps 34 are moved along said supporting member to the desired positions. The clamping block 44 of each clamp 34 is then moved to engage the uppermost mirror plate and the bolt 46 threaded downwardly through the lever 40 until the pad 48 engages the top plate 29 of supporting member 28. Continued tightening of the bolt 46 will result in the rear end of lever 40 being moved upwardly along bolt 46 to cause the forward end thereof carrying clamping block 44 to be urged downwardly to firmly clamp the stack of mirror plates in place.

In order to facilitate the proper positioning of the stack of mirror plates 10 upon the supporting member 28, there are provided two or more stops 50, each comprising a substantially rectangular block carried by a bolt 51, said bolt passing downwardly through said block and having threaded upon its lower end a nut 52 received within the longitudinally extending channel 35 in supporting member 28. The stop block 50 is preferably provided with a covering 53 of rubber, rubber composition, or other suitable cushioning material against which the inner edges of the mirror plates are adapted to abut as shown in Figs. 1 and 3.

As clearly illustrated in the drawings, when the stack of mirror plates 10 is secured upon the supporting member 28, the forward edges thereof to be ground project slightly beyond said supporting member and table 17. The grinding of the forward edges of the glass plates is effected by means of a grinding wheel 54 rotatable upon a horizontal shaft 55 journaled in a bearing 56 mounted upon a horizontal platform 57. Fixed to the grinding wheel shaft 55 is a pulley 58 about which is trained a belt 59 also running around a pulley 60 keyed to the shaft 61 of motor 62 also mounted upon horizontal platform 57.

The grinding wheel 54 serves to effect the grinding of the forward edges of the stack of mirror plates 10 as said plates are moved slowly first in one direction and then the other past said grinding wheel in contact therewith. The reciprocating movement of the table 17 is accomplished by rotation of the hand wheel 27 by the operator. The horizontal platform 57 is supported upon a horizontal base member 63 for movement toward and away from the table 17. The desired horizontal adjustment of the platform 57 may be effected by means of a bolt 64 threaded through a bearing 65 and suitably attached at its forward end to said platform 57, while carried upon the outer end of bolt 64 is a hand wheel 66. By turning the hand wheel 66, the platform 57 can be moved inwardly or outwardly to properly position the grinding wheel 54 with respect to the mirror plates to be operated upon.

After one longitudinal edge of the stack of mirror plates 10 has been ground, the stack of plates is reversed and the other longitudinal edge ground. In practice, it is preferred that approximately one-half of the glass to be removed be ground from one edge of the mirror plate and the other half ground from the opposite edge thereof. In order to indicate the amount of material to be removed and also to indicate when this has been done, suitable indicating means including a micrometer 67 is provided. The micrometer is carried at the upper end of a vertical arm 68 secured at its lower end to the upper end 69 of a bracket 70 by means of a bolt or the like 71 passing through a slot 72 in arm 68. The bracket 70 is substantially L-shaped and the horizontal portion thereof secured to the bottom of rail 19 by bolts or the like 73.

The numeral 74 designates a vertical lever pivoted intermediate its ends as at 75 to the bracket 68 and carrying at its lower end a freely rotatable roller 76 engaging the forward edge of the stack of mirror plates 10. The upper end of lever 74 is engageable by the stem 77 of the micrometer 67, said micrometer having the usual rotatable pointer 78 and graduations 79. The roller 76 is normally maintained in engagement with the stack of mirror plates by means of a tension spring 80 fastened at one end to the upper end of the lever 74 and at its opposite end to a lug 81 on arm 68. The outward movement of the upper end of lever 74 is limited by a stop bolt 82 threaded through a lug 83 also carried by arm 68.

When the stack of mirror plates 10 is secured upon the supporting member 28, the micrometer 67 will indicate the amount of glass to be ground from the edges of the plates and, as stated above, it is preferred that approximately one-half of the glass be removed from each of the longitudinal edges of the mirror plates. Consequently, when the micrometer indicates that approximately one-half of the glass to be removed has been ground off, the position of the mirror plates is reversed and the opposite edges ground until the micrometer indicates that the total desired amount of glass has been removed. In producing mirror plates of this type for use in forming rear view mirrors, relatively close tolerances are demanded, and therefore the provision of the micrometer 67 serves a very important purpose in determining just how much glass is to be removed and when it has been removed.

In making prismatic rear view mirrors as shown in Fig. 5, it is prefered that the opposite end edges and corners of the mirror plates be also ground, and a machine for grinding such edges and corners forms the subject-matter of our Patent No. 2,283,289, dated May 19, 1942. After the edges and corners of the mirror plates have been properly ground, the back surface 11 thereof is provided with a suitable mirror coat 15 which may be covered with a suitable backing 16 if desired. The protective backing 16 can also extend over the upper and lower edges 12 and 13 of the mirror plate if desired as shown in Fig. 5.

The clamps 34 serve to firmly secure the stack of mirror plates against displacement during grinding as well as preventing any relative movement between adjacent plates. These clamps also permit a stack of mirror plates to be easily and quickly secured in place and the position thereof readily reversed after the grinding of one edge thereof. In arranging the mirror plates as shown in Fig. 2, it is preferred that a sheet of paper 84 be interposed between adjacent plates to minimize the liability of scratching of adjacent glass surfaces and provide a cushion between adjacent plates. The horizontal pin 39 of each clamp 34 passes through openings 85 in the vertical arms 37 and 38, and a plurality of pairs of openings 85 may be provided to permit vertical adjustment of the horizontal lever 40 depending upon the number of mirror plates being ground. Due to the provision of the vertical slot 72 in the arm 68, the said arm and associated parts can also be adjusted vertically depending upon the number of mirror plates being operated upon.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for grinding the edges of plates of glass or the like, a horizontally reciprocating table, a substantially rectangular supporting member secured upon the top of said table and including a horizontal top plate provided intermediate the front and rear edges thereof with a longitudinally extending channel, the portion of said top plate forwardly of said channel adapted to support the plate to be ground horizontally thereupon, clamping means comprising a substantially vertical portion slidably mounted within said channel, a substantially horizontal lever pivotally mounted intermediate its ends on said substantially vertical portion to turn about a horizontal axis, a vertical bolt carried at the forward end of said lever provided at its lower end with a ball-like head, a clamping block having a socket receiving the ball-like head of said bolt therein and adapted to engage the plate to be ground for securing it in position upon said supporting member, a vertical bolt threaded through the rear end of said lever and a pad secured to the lower end of said last-named bolt and engaging the top plate of said supporting member rearwardly of said channel, said last-named bolt being adapted upon tightening thereof to rock said lever and urge said clamping block into engagement with the plate to be ground, and grinding means arranged forwardly of said supporting member and adapted to engage the forward edge of said plate upon reciprocation of said supporting member.

2. In apparatus for grinding the edges of plates of glass or the like, a horizontally reciprocating table, a substantially rectangular supporting member secured upon the top of said table and including a horizontal top plate provided intermediate the front and rear edges thereof with a longitudinally extending channel, the portion of said top plate forwardly of said channel adapted to support the plate to be ground horizontally thereupon, clamping means comprising a substantially vertical portion slidably mounted within said channel, a substantially horizontal lever pivotally mounted on said substantially vertical portion to turn about a horizontal axis, a clamping block adapted to engage the plate to be ground for securing it in position upon said supporting member, means for mounting said clamping block at the forward end of said lever for universal movement relative thereto, and means carried at the rear end of said lever engaging the top plate of said supporting means rearwardly of said channel for urging said clamping block into engagement with the plate to be ground, and grinding means arranged forwardly of said supporting member and adapted to engage the forward edge of said plate upon reciprocation of said supporting member.

3. In apparatus for grinding the edges of plates of glass or the like, a horizontally reciprocating table, a substantially rectangular supporting member secured upon the top of said table and including a horizontal top plate provided intermediate the front and rear edges thereof with a longitudinally extending channel, the portion of said top plate forwardly of said channel adapted to support the plate to be ground horizontally thereupon, clamping means comprising a substantially vertical portion slidably mounted within said channel, a substantially horizontal lever pivotally mounted on said substantially vertical portion for ready removal and to turn about a horizontal axis, a clamping block adapted to engage the plate to be ground for securing it in position upon said supporting member, means for mounting said clamping block at the forward end of said lever for universal movement relative thereon, and means carried at the rear end of said lever engaging the top plate of said supporting means rearwardly of said channel for urging said clamping block into engagement with the plate to be ground, a plurality of stops having portions slidably mounted within said channel and other portions against which the inner edge of the plate abuts, and grinding means arranged forwardly of said supporting member and adapted to engage the forward edge of said plate upon reciprocation of said supporting member.

GEORGE R. ROESCH.
GERALD WHITE.